United States Patent
Choi et al.

(10) Patent No.: US 11,921,557 B2
(45) Date of Patent: Mar. 5, 2024

(54) DATA PROCESSING SYSTEM, OPERATION METHOD THEREOF, AND STORAGE DEVICE THEREFOR

(71) Applicant: SK hynix Inc., Icheon-si (KR)

(72) Inventors: Ji Hun Choi, Icheon-si (KR); Jeong Hyun Kim, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 28 days.

(21) Appl. No.: 17/877,771

(22) Filed: Jul. 29, 2022

(65) Prior Publication Data

US 2023/0229218 A1 Jul. 20, 2023

(30) Foreign Application Priority Data

Jan. 20, 2022 (KR) .................. 10-2022-0008520

(51) Int. Cl.
  *G06F 1/26* (2006.01)
  *G06F 1/28* (2006.01)
  *G06F 9/48* (2006.01)
  *G06F 1/3203* (2019.01)

(52) U.S. Cl.
  CPC .............. *G06F 1/266* (2013.01); *G06F 1/28* (2013.01); *G06F 9/485* (2013.01); *G06F 1/3203* (2013.01)

(58) Field of Classification Search
  CPC . G06F 1/266; G06F 1/28; G06F 9/485; G06F 1/3234; G06F 1/3225; G06F 1/3268; G06F 1/3275; G06F 1/329; G06F 3/0652; G06F 3/0604; G06F 3/0611; G06F 3/0614; Y02D 10/00

USPC .......................................... 713/310
See application file for complete search history.

(56) References Cited

U.S. PATENT DOCUMENTS

| | | | |
|---|---|---|---|
| 2013/0282960 A1* | 10/2013 | Kannappan | G06F 12/0246 711/E12.008 |
| 2016/0180959 A1* | 6/2016 | Darragh | G11C 16/12 365/185.09 |
| 2018/0314448 A1* | 11/2018 | Grossman | G06F 3/064 |
| 2021/0247916 A1* | 8/2021 | Jung | G06F 3/0634 |
| 2022/0229566 A1* | 7/2022 | Benisty | G06F 3/0629 |

(Continued)

FOREIGN PATENT DOCUMENTS

| KR | 20050024788 A | 3/2005 |
|---|---|---|
| KR | 101476568 B1 | 12/2014 |
| KR | 20160122911 A | 10/2016 |

(Continued)

*Primary Examiner* — Volvick Derose
(74) *Attorney, Agent, or Firm* — Perkins Coie LLP

(57) ABSTRACT

A data processing system may include a storage device configured to: transmit, to an exterior, prediction information, for each power mode, that indicates a predicted time for performing a background operation for managing a memory device; and perform the background operation in an idle state of the storage device by switching to a corresponding power mode in response to a power mode control signal that is received in the idle state; and a control device configured to: determine a power mode of the storage device and an idle time for the idle state during which the background operation is performed based on the prediction information; transmit the power mode control signal to the storage device; and suspend, during the idle time, execution of a command processing request transmitted to the storage device.

19 Claims, 9 Drawing Sheets

(56) References Cited

U.S. PATENT DOCUMENTS

2023/0041215 A1* 2/2023 Porzio .................. G06F 3/0625

FOREIGN PATENT DOCUMENTS

| KR | 20170120489 A | 10/2017 |
| KR | 101946458 B1 | 2/2019 |
| KR | 20190069286 A | 6/2019 |
| KR | 102149679 B1 | 8/2020 |

* cited by examiner

DATA PROCESSING SYSTEM, OPERATION METHOD THEREOF, AND STORAGE DEVICE THEREFOR

PRIORITY CLAIM AND CROSS-REFERENCES TO RELATED APPLICATION

This patent document claims the priority and benefits of Korean application number 10-2022-0008520, filed on Jan. 20, 2022, which is incorporated herein by reference in its entirety as part of the disclosure of this patent document.

TECHNICAL FIELD

Various embodiments generally relate to a semiconductor integrated apparatus, and more particularly, to a data processing system, an operation method thereof, and a storage device therefor.

BACKGROUND

Data processing systems produce a set of outputs in response to receiving a set of inputs and a request from external devices. Data processing systems may include a data storage device to store input and output data in a data storage medium in response to a request of external devices.

Examples of the data storage medium may include non-volatile memory devices, such as flash memory devices.

Flash memory devices can manage the memory space by performing a housekeeping operation such as data migration, garbage collection, and wear leveling.

The housekeeping operation may guarantee the reliability of data storage and secure a data storage space. However, when the housekeeping operation is not performed in a timely manner due to another high priority process or an external request, the overall performance of the data processing system may be degraded.

SUMMARY

A data processing system based on some embodiments of the disclosed technology may include: a storage device configured to: transmit, to an exterior, prediction information, for each power mode, that indicates a predicted time for performing a background operation for managing a memory device; and perform the background operation in an idle state of the storage device by switching to a corresponding power mode in response to a power mode control signal that is received in the idle state; and a control device configured to: determine a power mode of the storage device and an idle time for the idle state during which the background operation is performed based on the prediction information; transmit the power mode control signal to the storage device; and suspend, during the idle time, execution of a command processing request transmitted to the storage device.

An operation method of a data processing system based on some embodiments of the disclosed technology may include: generating prediction information that indicates a prediction, for each power mode, of a time it takes to perform a background operation for managing a memory device; determining a power mode of the storage device and an idle time for performing the background operation based on the prediction information to transmit a power mode control signal corresponding to the power mode to the storage device; upon receiving the power mode control signal in an idle state, performing the background operation by switching to a power mode corresponding to the power mode control signal; and suspending, during the idle time, execution of a command processing request transmitted to the data processing system.

A storage device based on some embodiments of the disclosed technology may include: a memory device; and a memory controller configured to: transmit, to an exterior, prediction information, for each power mode, that indicates a predicted time for performing a background operation for managing the memory device to be performed; and perform the background operation on the memory device in an idle state by switching to a corresponding power mode in response to receiving a power mode control signal from the exterior in the idle state.

A data processing system based on some embodiments of the disclosed technology may include: a storage device configured to transmit, to an exterior, prediction information obtained by predicting, for each power mode, a time required for a background operation for managing a memory device, and to perform the background operation by switching to a corresponding power mode when a power mode control signal is received in an idle state; and an external device configured to determine a power mode of the storage device and an intentional idle time for the background operation on the basis of the prediction information, to generate the power mode control signal, to transmit the power mode control signal to the storage device, and to suspend a command processing request to the storage device during the intentional idle time.

An operation method of a data processing system based on some embodiments of the disclosed technology may include: a step in which a storage device predicts, for each power mode, a time required for a background operation for managing a memory device and transmits the prediction information; a step in which an external device determines a power mode of the storage device and an intentional idle time for the background operation on the basis of the prediction information, generates a power mode control signal, and transmits the power mode control signal to the storage device; a step in which, upon receiving the power mode control signal in an idle state, the storage device performs the background operation by switching to a power mode corresponding to the power mode control signal; and a step in which the external device suspends a command processing request to the storage device during the intentional idle time.

A storage device based on some embodiments of the disclosed technology may include: a memory device; and a memory controller configured to transmit, to an exterior, prediction information obtained by predicting, for each power mode, a time required for a background operation for managing the memory device, and to perform the background operation on the memory device by switching to a corresponding power mode when a power mode control signal is received from the exterior in an idle state.

A data processing system based on some embodiments of the disclosed technology may include: a storage device configured to: transmit, to an external device, prediction information, for each power mode, that indicates a predicted time for performing a background operation for managing a memory device; and perform the background operation in an idle state of the storage device by switching to a corresponding power mode in response to a power mode control signal that is received in the idle state; and a control device configured to: determine a power mode of the storage device and an idle time for the idle state during which the background operation is performed based on the prediction information; transmit the power mode control signal to the storage device; and suspend, during the idle time, execution of a command processing request transmitted to the storage device.

A storage device based on some embodiments of the disclosed technology may include: a memory device; and a memory controller configured to: transmit, to an external device, prediction information, for each power mode, that indicates a predicted time for performing a background operation for managing the memory device to be performed; and perform the background operation on the memory device in an idle state by switching to a corresponding power mode in response to receiving a power mode control signal from the external device in the idle state.

DETAILED DESCRIPTION

Hereinafter, embodiments of the present technology will be described in more detail with reference to the accompanying drawings.

Figure 1:
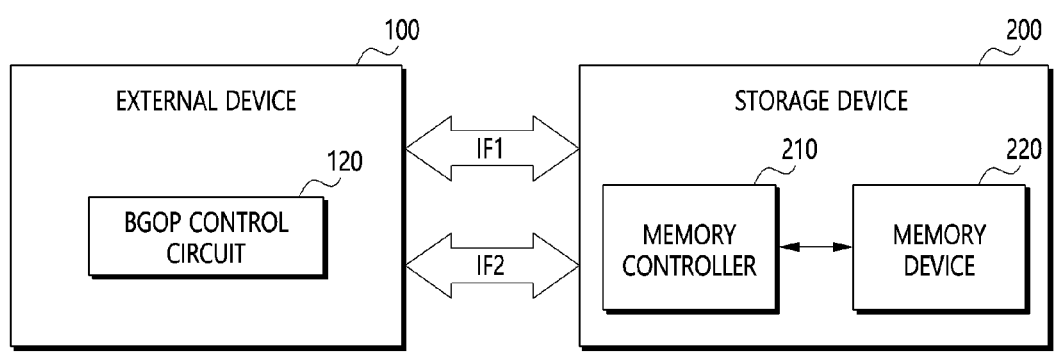
FIG. 1 illustrates an example of a data processing system based on some embodiments of the disclosed technology.

FIG. 1 illustrates an example of a data processing system 10 based on some embodiments of the disclosed technology.

Referring to FIG. 1, the data processing system 10 based on some embodiments of the disclosed technology may include a storage device 200 that exchanges data with another device. In some implementations, the term "storage device" may indicate a data storage device that is used to temporarily or permanently hold data. In some implementations, the "another device" may indicate an exterior or control device or external device 100 such as a host device to which the storage device 200 is connected. In some implementations, the external device 100 may include a control device in the data processing system 10.

The external device 100 and the storage device 200 may be connected to each other through a first interface IF1 and a second interface IF2. In some implementations, the external device 100 may include a control device located in the data processing system 10.

The first interface IF1 may include a hardware and/or software component that allows the external device 100 interacts or communicates with the storage device 200. The first interface IF1 may include at least one of interface devices based on standard interface protocols such as a secure digital, a universal serial bus (USB), a multi-media card (MMC), an embedded MMC (eMMC), a personal computer memory card international association (PCM-CIA), a parallel advanced technology attachment (PATA), a serial advanced technology attachment (SATA), a small computer system interface (SCSI), a serial attached SCSI (SAS), a peripheral component interconnection (PCI), a PCI express (PCI-E), and a universal flash storage (UFS).

The second interface IF2 may include at least one of interface devices based on system management bus (SM-Bus), inter-integrated circuit (I2C), and improved inter-integrated circuit (I3C) protocols.

The storage device 200 may include a memory controller 210 and a memory device 220.

The memory controller 210 may control the memory device 220 in response to a request of the external device 100. For example, the memory controller 210 may allow data to be programmed in the memory device 220 in response to a write request from the external device 100. Furthermore, the memory controller 210 may provide the data recorded in the memory device 220 to the external device 100 in response to a read request from the external device 100.

The memory device 220 may record data or output the recorded data under the control of the memory controller 210. The memory device 220 may be configured as a volatile or nonvolatile memory device. In an embodiment, the memory device 220 may be implemented using a memory element selected from various nonvolatile memory elements such as an electrically erasable and programmable ROM (EEPROM), a NAND flash memory, a NOR flash memory, a phase-change RAM (PRAM), a resistive RAM (ReRAM), a ferroelectric RAM (FRAM), and a spin torque transfer magnetic RAM (STT-MRAM). The memory device 220 may include a plurality of dies Die 0 to Die n, a plurality of chips, or a plurality of packages. In addition, the memory device 220 may include a single-level cell (SLC) that stores one-bit data in one memory cell or a multi-level cell (MLC) that stores multiple bits of data in one memory cell.

The memory controller 210 based on some embodiments of the disclosed technology may be configured to transmit, to the external device 100, prediction information obtained by predicting, for each power mode, a time required for a background operation. The background operation may include at least one of management operations for the memory device 220 such as garbage collection, data migration, wear leveling, read refresh, and background trim.

When a power mode control signal is received from the external device 100 in an idle state of the storage device 200, the memory controller 210 may change a power mode and perform the background operation. At this time, the external device 100 may recognize that the storage device 200 is in an idle state.

In an embodiment, the prediction information and the power mode control signal may be transmitted/received through the second interface IF2; however, the present technology is not limited thereto.

The external device 100 based on some embodiments of the disclosed technology may include a background operation (BGOP) control circuit 120. The BGOP control circuit 120 may determine a power mode of the storage device 200 and an allocable idle time, that is, an intentional idle time to process the background operation as the prediction information is transmitted from the storage device 200 through the second interface IF2. The external device 100 may transmit the power mode control signal to the storage device 200, and suspend a command processing request so that the storage device 200 does not process a command of the external device 100 during the intentional idle time after the power mode control signal is transmitted. In an embodiment, the power mode control signal may include intentional idle time information.

In an embodiment, the external device 100 may refer to the temperature of the data processing system 10 or the storage device 200 in order to determine a power mode. To this end, the storage device 200 may transmit prediction information including temperature information.

The prediction information provided by the storage device 200 may include, for example, a predicted or required time for a background operation predicted to be performed for each power mode as shown in [Table 1] below.

TABLE 1

| Power mode | Time required for background operation (ms) |
|---|---|
| PL0 | 30 |
| PL1 | 50 |
| PL2 | 100 |
| PL3 | 200 |
| PL4 | 500 |

When a power mode is determined in response to the prediction information, the external device 100 may determine the intentional idle time on the basis of the required or predicted time for performing a background operation for each power mode included in the prediction information. Taking Table 1 above as an example, when the external device 100 determines PL3 as a power mode, the intentional idle time may be [200 ms+$\alpha$]. The value "$\alpha$" may be a default value set in the external device 100 or a value set to be changeable by a user.

Upon receiving the power mode control signal in the idle state, the storage device 200 may perform the background operation by switching to a corresponding power mode. Since the external device 100 suspends execution of a command processing request to the storage device 200 during the intentional idle time after the power mode control signal is transmitted, the storage device 200 may complete the background operation without performance degradation and substantially maintain the data processing system 10 in an optimal state.

In a case that execution of a command is suspended after the intentional idle time passes, the external device 100 may request the execution or processing of the suspended command by transitioning the storage device 200 to an activated state.

Figure 2:
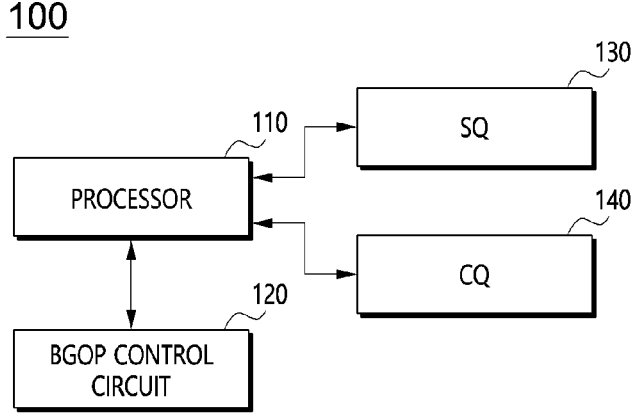
FIG. 2 illustrates an example of an external device based on some embodiments of the disclosed technology.

FIG. 2 illustrates an example of the external device 100 based on some embodiments of the disclosed technology.

Referring to FIG. 2, the external device 100 may include a processor 110, the BGOP control circuit 120, a submission queue (SQ) 130, and a completion queue (CQ) 140.

The processor 110 may include any well-known CPU and/or FPGA configured to execute instructions and communicate with other components and devices in the external device 100.

The BGOP control circuit 120 may determine the power mode of the storage device 200 and the intentional idle time on the basis of the prediction information transmitted from the storage device 200. The generated power mode control signal may be transmitted to the storage device 200. When the power mode control signal is received in the idle state of the storage device 200, the storage device 200 may perform the background operation by switching to a corresponding power mode. The prediction information may include a predicted time for the background operation to be performed for each power mode, and may further include temperature information of the data processing system 10 or the storage device 200. When the prediction information includes the temperature information, the BGOP control circuit 120 may determine the power mode by further referring to the temperature information.

The SQ 130 may be a memory space where a command generated by the external device 100 is stored. The CQ 140 may be a memory space for recording a processing result of the command stored in the SQ 130 as the command is processed by the storage device 200.

A method in which the external device 100 and the storage device 200 communicate with each other on the basis of a queue pair including the SQ 130 and the CQ 140 is referred to as a command queue base interface method.

In an embodiment, the BGOP control circuit 120 may suspend the update of a submission queue doorbell corresponding to the command stored in the SQ 130 during the intentional idle time.

The submission queue doorbell is a storage space for storing a tail pointer of the SQ 130, and may be allocated as a part of a memory space included in the memory controller 210 of the storage device 200. When the tail pointer stored in the submission queue doorbell is updated, the memory controller 210 may recognize that a new command has been requested by the external device 100.

The command queue base interface method will be described below in detail with reference to FIG. 5.

Figure 3:
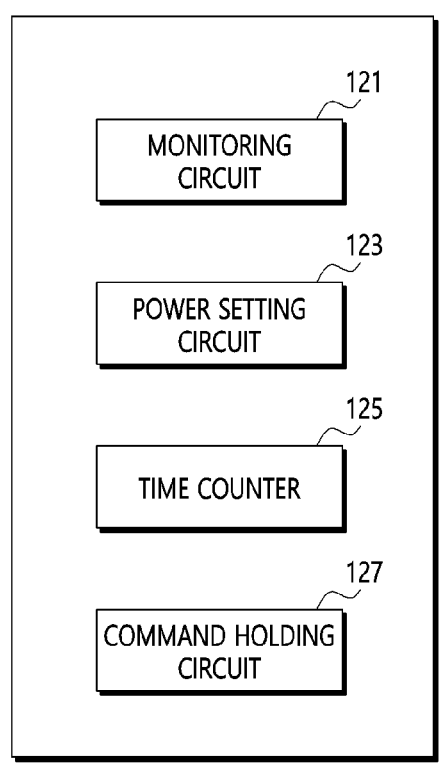
FIG. 3 illustrates an example of a background operation control unit based on some embodiments of the disclosed technology.

FIG. 3 illustrates an example of the BGOP control circuit based on some embodiments of the disclosed technology.

Referring to FIG. 3, the BGOP control circuit 120 may include a monitoring circuit 121, a power setting circuit 123, a time counter 125, and a command holding circuit 127.

The monitoring circuit 121 may be configured to check whether the storage device 200 transmits prediction information and whether the storage device 200 is in an idle state.

When the storage device 200 is transitioned to an idle state, the power setting circuit 123 may determine a power mode of the storage device 200 and an intentional idle time on the basis of the prediction information transmitted by the storage device 200. In an embodiment, the prediction information may include a predicted time for the background operation to be performed for each power mode, and may further include temperature information of the data processing system 10 or the storage device 200. When the temperature information is taken into consideration in order to determine a power mode, damage or failure due to a temperature rise of the data processing system 10 may be substantially prevented.

A power mode control signal generated by the power setting circuit 123 may be transmitted to the storage device 200. Upon receiving the power mode control signal in an idle state, the storage device 200 may perform the background operation by switching to a corresponding power mode.

The time counter 125 may measure an intentional idle time from the time point at which the power setting circuit 123 transmits the power mode control signal to the storage device 200.

When a new command is stored in the SQ 130 before the time counter 125 expires, the command holding circuit 127 may be configured to suspend the update of a corresponding submission queue doorbell register. When an unprocessed command exists in the SQ 130 after the time counter 125 expires, the command holding circuit 127 may update a corresponding doorbell register.

Figure 4:
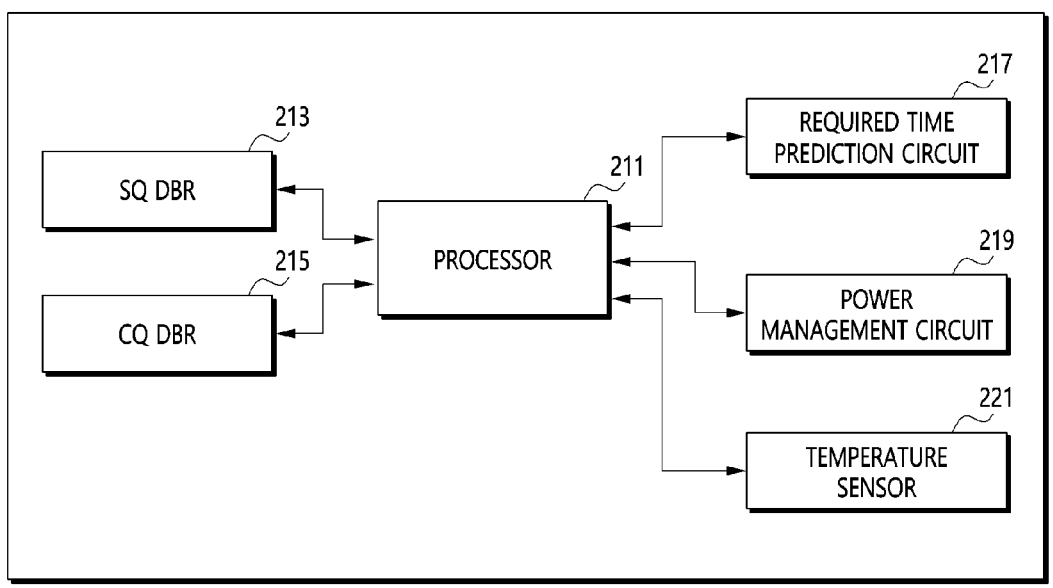
FIG. 4 illustrates an example of a memory controller based on some embodiments of the disclosed technology.

FIG. 4 illustrates an example of the memory controller based on some embodiments of the disclosed technology.

Referring to FIG. 4, the memory controller 210 based on some embodiments of the disclosed technology may include a processor 211, a submission queue (SQ) doorbell register (DBR) 213, a completion queue (CQ) doorbell register (DBR) 215, a required time prediction circuit 217, a power management circuit 219, and a temperature sensor 221.

The processor 211 may use firmware to perform various operations on the storage device 200. In an embodiment, the processor 211 may perform operations associated with a flash translation layer (FTL) such as a house keeping operation, which includes a background operation such as garbage collection, data migration, wear leveling, read refresh, and background trim for managing the memory device 220, an error check and correction (ECC) function of detecting and correcting an error of data read from the memory device 220, and others.

Although not illustrated in the drawings, the memory controller 210 may include other components that may be required when the storage device 200 operates, such as an external device interface, a memory interface, a RAM, a ROM, a buffer memory, and a buffer memory manager or controller.

Each of the SQ DBR 213 and the CQ DBR 215 is a register for managing or controlling a queue pair generated by the external device 100, that is, a submission queue (SQ 130 of FIG. 1) and a completion queue (CQ 140 of FIG. 1). The SQ DBR 213 and the CQ DBR 215 may each correspond to one queue pair (SQ and CQ).

The submission queue (SQ) may sequentially store commands generated by the external device 100, and the SQ DBR 213 may store a tail pointer indicating the last command storage position of the submission queue (SQ).

As the storage device 200 processes a command and then records the completion of the processing of the command in the completion queue (CQ), a head pointer of the submission queue (SQ) increases, and the CQ DBR 215 may receive the head pointer of the completion queue (CQ) from the external device 100 and store the received head pointer.

In an embodiment, the external device 100 may suspend execution of a command processing request during an intentional idle time determined by the external device 100, which may include an operation for suspending the update of the SQ DBR 213.

Figure 5:
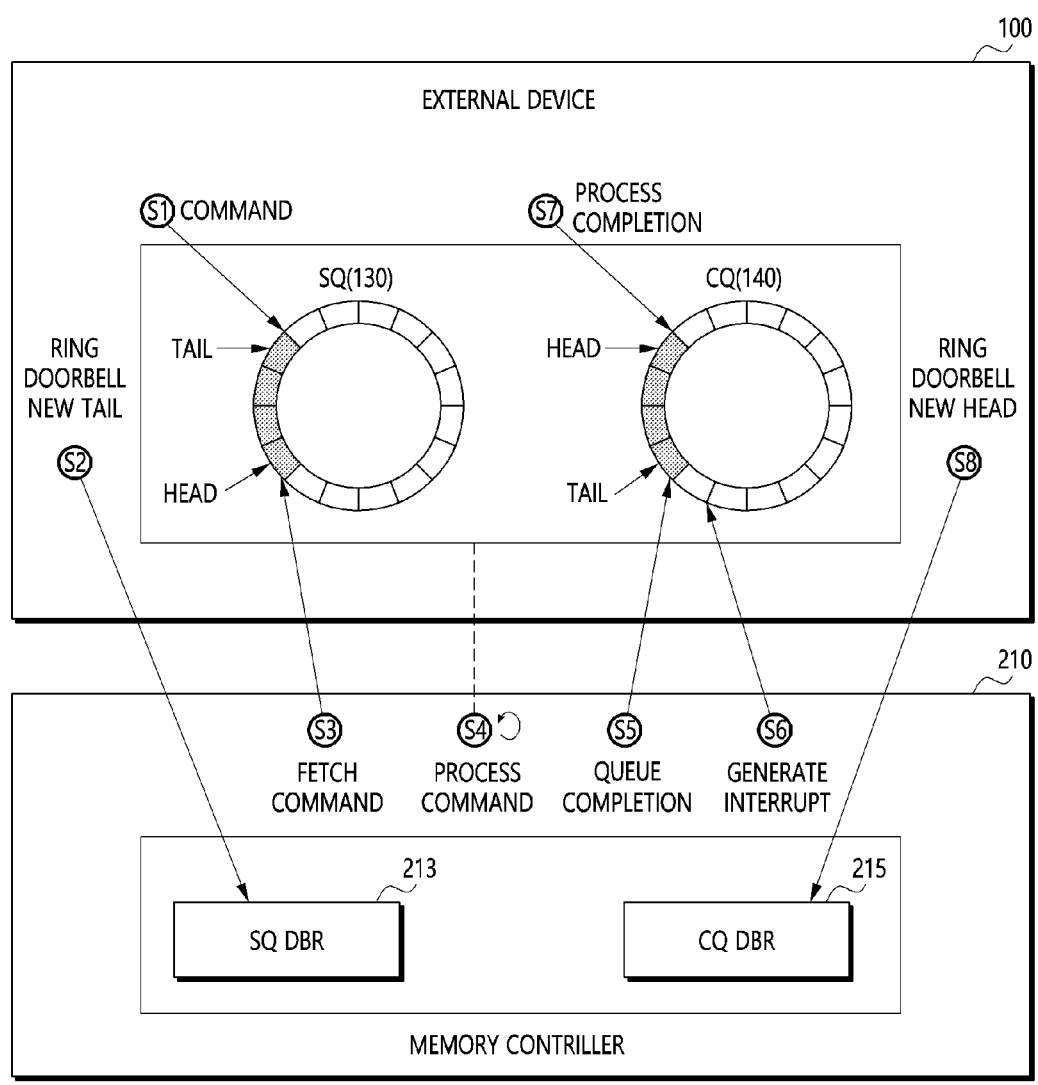
FIG. 5 illustrates an example of a memory controller in communication with an external to carry out a command processing process based on some embodiments of the disclosed technology.

FIG. 5 is a conceptual diagram for explaining a command processing process based on some embodiments of the disclosed technology.

The memory controller 210 of the storage device 200 may communicate with the external device 100 on the basis of a command queue base interface. A command queue base interface operation may be performed on the basis of a queue pair including the submission queue (SQ) 130 for the input of a requested command and the completion queue (CQ) 140 for recording a processing result of the command.

When the external device 100 includes a plurality of cores, each of the plurality of cores may perform an interface operation with the storage device 200, and the memory controller 210 on the basis of one queue pair including one submission queue (SQ) 130 and one completion queue (CQ) 140.

The memory controller 210 may include the SQ DBR 213 and the CQ DBR 215 for performing the command queue base interface operation.

Each of the SQ DBR 213 and the CQ DBR 215 is a register for managing or controlling the queue pair 130 and 140 generated by the external device 100. Each of the SQ DBR 213 and the CQ DBR 215 may correspond to one queue pair. For example, each of the SQ DBR 213 and the CQ DBR 215 may store a tail pointer indicating a tail of the submission queue (SQ) 130 and a head pointer indicating a head of the completion queue (CQ). The memory controller 210 may perform an interface operation with the external device 100 by accessing a queue pair corresponding to each of the SQ DBR 213 and the CQ DBR 215.

Specifically, the external device 100 may generate the submission queue 130 and the completion queue 140 in a memory in the external device 100.

The memory controller 210 may access the submission queue 130 and the completion queue 140 through the SQ DBR 213 and the CQ DBR 215, thereby processing a command requested by the external device 100 and notifying a processing result.

For example, the external device 100 may transmit a command COMMAND to the submission queue 130 in order to request a data read or write operation from the storage device 200 (S1). The tail pointer of the submission queue 130 may be updated, and the external device 100 may record the updated tail pointer in the SQ DBR 213 of the memory controller 210 for update (S2).

The memory controller 210 may fetch the COMMAND from the submission queue 130 (S3) and process (or execute) the fetched COMMAND (S4). After processing the COMMAND, the memory controller 210 may record the completion of the processing of the COMMAND in the completion queue 140 (S5). At this time, the head pointer of the completion queue 140 may increase. As the memory controller 210 generates an interrupt signal (S6), the external device 100 may process command completion (S7). The external device 100 may record the updated head pointer of the completion queue (CQ) in the CQ DBR 215 of the memory controller 210 for update.

In the command processing process based on such a command queue base interface, the BGOP control circuit 120 based on some embodiments of the disclosed technology may transmit a power mode control signal to the storage device 200 in an idle state and then suspend the update time point of the SQ DBR 213, which corresponds to the COMMAND stored in the submission queue 130, until an intentional idle time expires, thereby allowing the storage device 200 to perform a background operation without processing a request of the external device 100.

Referring back to FIG. 4, the required time prediction circuit 217 may generate prediction information by predicting, for each power mode, a time required for the memory controller 210 to process the background operation of the memory device 220.

Taking a garbage collection operation as an example, when the number of valid pages to be secured is 100, a required time when a power mode is the highest (maximum performance mode) may be calculated as expressed by [Equation 1] below.

$$\text{Required time\_highest power mode} = (100 \times (\text{page read time} + \text{page program time})) + (\text{block erase time}) \quad \text{[Equation 1]}$$

Various power modes such as ½ performance and ¼ performance of the maximum performance mode may exist, and the required time increases as the performance mode number decreases. For example, in the ½ performance mode, it may take about twice as long as in the maximum performance mode, and in the ¼ performance mode, it may take about four times as long as in the maximum performance mode.

In some implementations, environment variables, for example, a command transmission time or a response time in the storage device 200, an operation method of the memory device 220 such as plane interleaving, a bus bandwidth between the memory device 220 and a buffer memory (not illustrated), and an overhead of the processor 211, may be used or taken into account, in addition to the Equation above, to more precisely calculate the time required for the background operation for each power mode.

When <Condition 1> is satisfied in a state where the environment variables are ignored, the time required for the background operation for each power mode may be calculated as expressed by [Equation 2] below.

[Condition 1]
Number of valid pages to be secured=100
Bus bandwidth=400 MB/s
1 page size=16 KB
Block erase time=5 ms
1 page transmission time=(400×1024 KB)/16 KB=40 us $$\text{Required time\_highest power mode} = (100 \times (40 \text{ us} + 40 \text{ us})) + 5 \text{ ms} = 13 \text{ ms} \quad \text{[Equation 2]}$$

Required time_½ power mode=26 ms
Required time_¼ power mode=52 ms

The power management circuit 219 changes the power mode of the storage device 200 on the basis of the power mode control signal transmitted from the external device 100 while the storage device 200 is in the idle state. As the power mode is switched from the idle state, the processor 211 may perform the background operation.

In some implementations, background operations may have priorities in the order of, for example, garbage collection, data migration, wear leveling, read refresh, and background trim.

When the power mode is switched during the idle state of the storage device 200, the processor 211 may perform the background operations in the order of their priorities. When the power mode control signal includes information on an intentional idle time, the processor 211 may distribute the intentional idle time according to the priority of the background operation and sequentially perform a plurality of background operations.

The temperature sensor 221 may sense or detect the temperature of the data processing system 10 or the storage device 200. In such a case, the required time prediction circuit 217 may transmit prediction information including temperature information to the external device 100.

Figure 6:
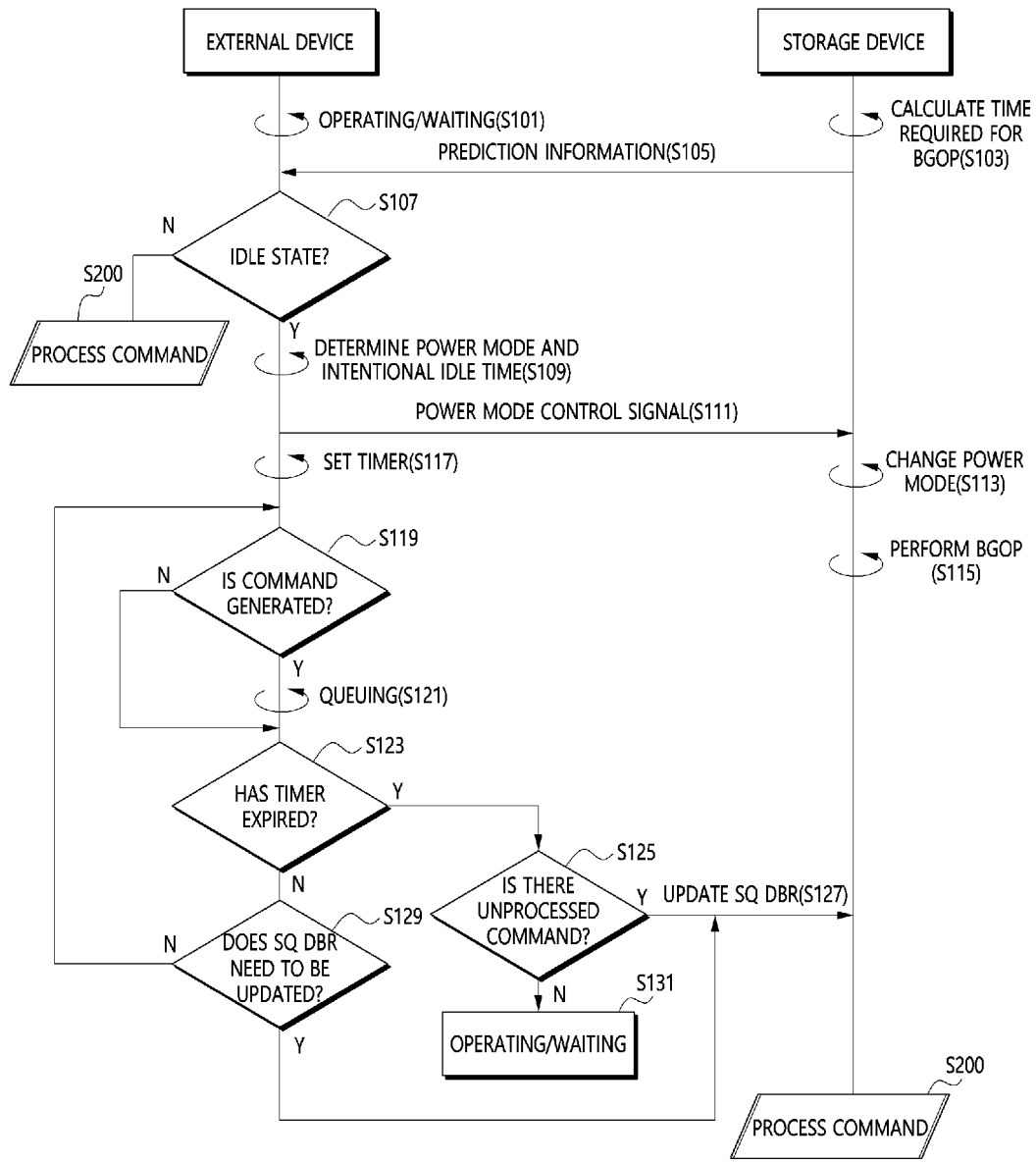
FIG. 6 illustrates an example of an operation method of the data processing system based on some embodiments of the disclosed technology.

FIG. 6 is a flowchart for explaining an operation method of the data processing system based on some embodiments of the disclosed technology.

Referring to FIG. 6, while the external device 100 is operating or waiting (S101), the storage device 200 may generate prediction information by predicting, for each power mode, a time required for processing a background operation of the memory device 220 (S103), and transmit the prediction information to the external device 100 (S105). In an embodiment, the prediction information may include a predicted or required time for the background operation to be performed for each power mode, and may further include temperature information of the data processing system 10 or the storage device 200, in addition to the predicted or required time.

The background operation may include a management operation for the memory device 220 such as garbage collection, data migration, wear leveling, read refresh, and background trim.

As the prediction information is transmitted from the storage device 200, the external device 100 may check whether the storage device 200 is in an idle state (S107).

When the storage device 200 is in the idle state (S107:Y), the external device 100 may determine a power mode of the storage device 200 and an intentional idle time on the basis of the prediction information transmitted by the storage device 200 and generate a power mode control signal including the determined power mode and intentional idle time (S109). When the prediction information further includes temperature information, the external device 100 may additionally consider the temperature information in order to determine a power mode.

When the storage device 200 is not in the idle state (S107:N), the external device 100 may request the storage device 200 to process a command (S200). The command processing process (S200) may be performed on the basis of, for example, the command queue base interface illustrated in FIG. 5; however, the disclosed technology is not limited thereto.

The power mode control signal generated by the external device 100 at S109 may be transmitted to the storage device 200 (S111). Upon receiving the power mode control signal in the idle state, the storage device 200 may change a power mode according to the power mode included in the power mode control signal (S113), and perform the background operation (S115).

In some implementations, after transmitting the power mode control signal to the storage device 200, the external device 100 may set a timer and count whether the intentional idle time has expired (S117).

The external device 100 may check whether a new command is generated (S119), and when a command is generated (S119: Y), the external device 100 may store the generated command in the submission queue (S121). After storing the command in the submission queue, when no command is generated (S119: N), the external device 100 may check whether the timer has expired (S123).

When the timer has expired (S123: Y), the external device 100 checks whether there is an unprocessed command in the submission queue (S125).

When there is an unprocessed command (S125: Y), the external device 100 may update the submission queue doorbell register (SQ DBR) (S127), and request the storage device 200 to process a command. Accordingly, the storage device 200 may process the command on the basis of, for example, the command queue base interface illustrated in FIG. 5 (S200).

When there is no unprocessed command (S125: N), the external device 100 may process another operation or may be transitioned to a waiting state (S131).

In some implementations, when the timer has not expired (S123: N), that is, when the intentional idle time remains, the external device 100 may check whether the submission queue doorbell register (SQ DBR) needs to be updated (S129). A case where the submission queue doorbell register (SQ DBR) needs to be updated may be a case where the submission queue is in a full state; however, the disclosed technology is not limited thereto.

When the submission queue doorbell register (SQ DBR) does not need to be updated (S129: N), the external device 100 may suspend execution of a command processing request to the storage device 200 by not updating the submission queue doorbell register (SQ DBR). Then, the external device 100 proceeds to S119 to check whether a new command is generated.

When the submission queue doorbell register (SQ DBR) needs to be updated (S129: Y) because the submission queue is full of commands being suspended, the external device 100 may update the submission queue doorbell register (SQ DBR) (S127) and the storage device 200 may process commands inputted to the submission queue (S200).

As described above, the storage device 200 generates prediction information including a required time predicted for each power mode and required for a background operation, and transmits the generated prediction information to the external device 100. Furthermore, when a power mode control signal is transmitted from the external device 100, the storage device 200 in an idle state switches to a corresponding power mode and performs a background operation.

When the storage device 200 enters an idle state, the external device 100 determines a power mode of the storage device 200 and an intentional idle time on the basis of the prediction information, allows the storage device 200 to be transitioned to a corresponding power mode, and suspends execution of a command processing request during the determined intentional idle time. As a consequence, the storage device 200 may respond to a request of the external device 100 with optimal performance by stably performing a background operation during the intentional idle time ensured by the external device 100.

Figure 7:
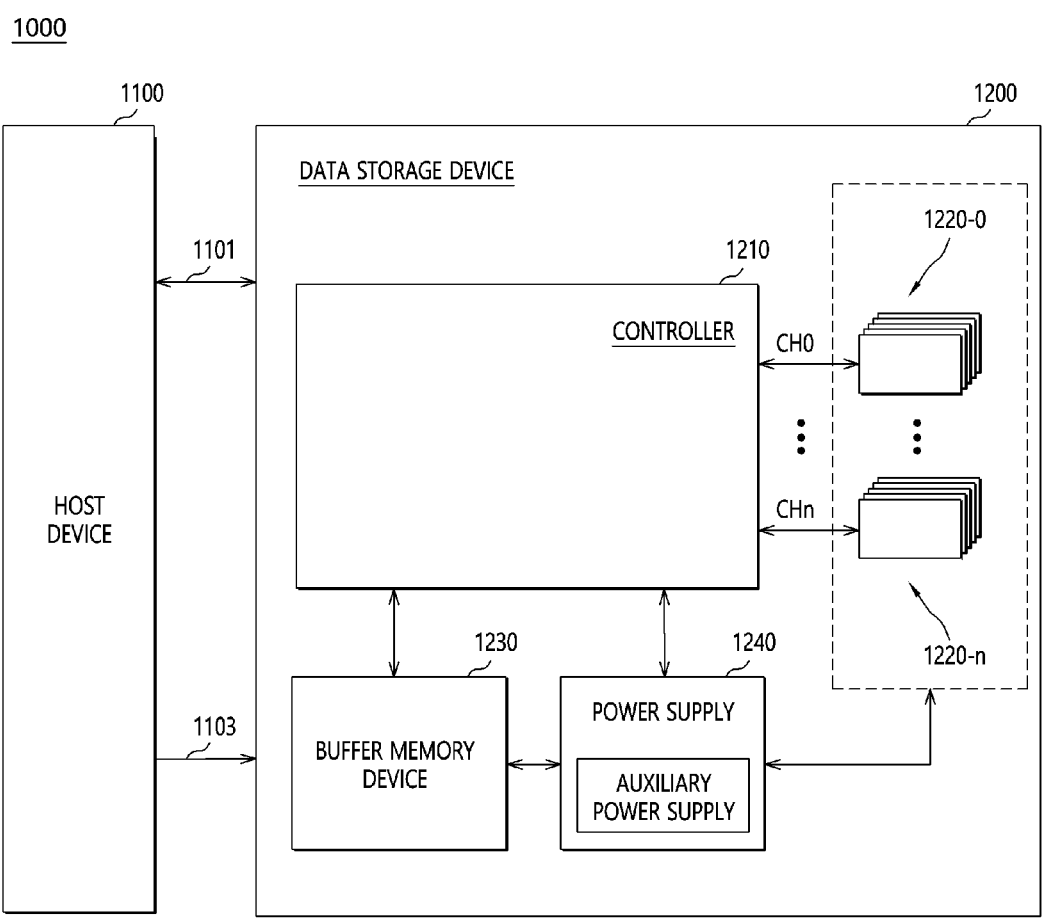
FIG. 7 illustrates an example of a data storage system based on some embodiments of the disclosed technology.

FIG. 7 is a diagram illustrating an example of a data storage system 1000, based on some embodiments of the disclosed technology.

Referring to FIG. 7, the data storage 1000 may include a host device 1100 and the data storage device 1200. In an embodiment, the data storage device 1200 may be configured as a solid state drive (SSD).

The host device 1100 is configured to comprise external device 100 shown in FIGS. 1-3. The data storage device 1200 is configured to comprise the storage device 200 shown in FIGS. 1-4.

The data storage device 1200 may include a controller 1210, a plurality of nonvolatile memory devices 1220-0 to 1220-$n$, a buffer memory device 1230, a power supply 1240, a signal connector 1101, and a power connector 1103.

The controller 1210 may control general operations of the data storage device 1200. The controller 1210 may include a host interface unit, a control unit, a random access memory used as a working memory, an error correction code (ECC) unit, and a memory interface unit. In an embodiment, the controller 1210 may configured as controller 110 shown in FIGS. 1 and 2.

The host device 1100 may exchange a signal with the data storage device 1200 through the signal connector 1101. The signal may include a command, an address, data, and so forth.

The controller 1210 may analyze and process the signal received from the host device 1100. The controller 1210 may control operations of internal function blocks according to firmware or software for driving the data storage device 1200.

The buffer memory device 1230 may temporarily store data to be stored in at least one of the nonvolatile memory devices 1220-0 to 1220-$n$. Further, the buffer memory device 1230 may temporarily store the data read from at least one of the nonvolatile memory devices 1220-0 to 1220-$n$. The data temporarily stored in the buffer memory device 1230 may be transmitted to the host device 1100 or at least one of the nonvolatile memory devices 1220-0 to 1220-$n$ according to control of the controller 1210.

The nonvolatile memory devices 1220-0 to 1220-$n$ may be used as storage media of the data storage device 1200. The nonvolatile memory devices 1220-0 to 1220-$n$ may be coupled with the controller 1210 through a plurality of channels CH0 to CHn, respectively. One or more nonvolatile memory devices may be coupled to one channel. The nonvolatile memory devices coupled to each channel may be coupled to the same signal bus and data bus.

The power supply 1240 may provide power inputted through the power connector 1103 to the controller 1210, the nonvolatile memory devices 1220-0 to 1220-$n$ and the buffer memory device 1230 of the data storage device 1200. The power supply 1240 may include an auxiliary power supply. The auxiliary power supply may supply power to allow the data storage device 1200 to be normally terminated when a sudden power interruption occurs. The auxiliary power supply may include bulk-capacity capacitors sufficient to store the needed charge.

The signal connector 1101 may be configured as one or more of various types of connectors depending on an interface scheme between the host device 1100 and the data storage device 1200.

The power connector 1103 may be configured as one or more of various types of connectors depending on a power supply scheme of the host device 1100.

Figure 8:
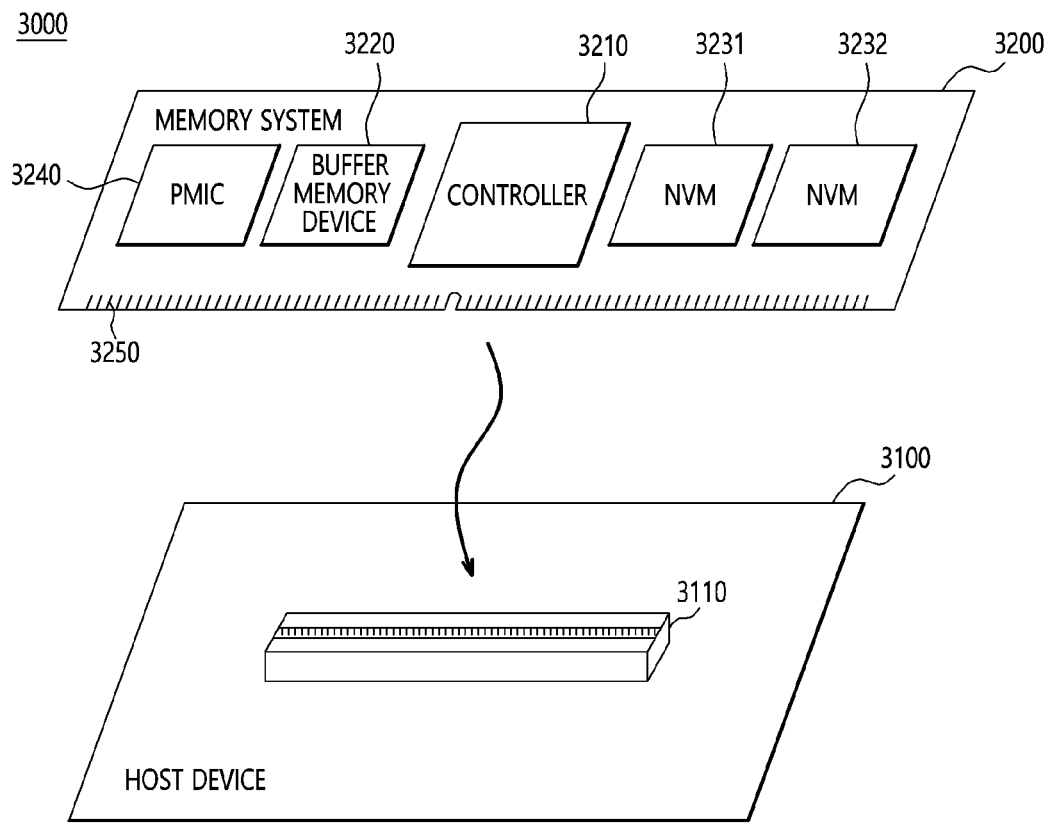
FIG. 8 illustrates an example of a data processing system based on some embodiments of the disclosed technology.

FIG. 8 is a diagram illustrating an example of a data processing system 3000, based on some embodiments of the disclosed technology. Referring to FIG. 8, the data processing system 3000 may include a host device 3100 and a memory system 3200.

The host device 3100 is configured to comprise external device 100 shown in FIGS. 1 to 3. The data memory system 3200 is configured to comprise the storage device 200 shown in FIG. 1 or 4.

The host device 3100 may be configured in the form of a board, such as a printed circuit board. Although not shown, the host device 3100 may include internal function blocks for performing the function of a host device.

The host device 3100 may include a connection terminal 3110, such as a socket, a slot, or a connector. The memory system 3200 may be mated to the connection terminal 3110.

The memory system 3200 may be configured in the form of a board, such as a printed circuit board. The memory system 3200 may be referred to as a memory module or a memory card. The memory system 3200 may include a controller 3210, a buffer memory device 3220, nonvolatile memory devices 3231 and 3232, a power management integrated circuit (PMIC) 3240, and a connection terminal 3250.

The controller 3210 may control general operations of the memory system 3200. The controller 3210 may be configured in the same manner as the memory controller 210 shown in FIG. 1 or 4.

The buffer memory device 3220 may temporarily store data to be stored in the nonvolatile memory devices 3231 and 3232. Further, the buffer memory device 3220 may temporarily store data read from the nonvolatile memory devices 3231 and 3232. The data temporarily stored in the buffer memory device 3220 may be transmitted to the host device 3100 or the nonvolatile memory devices 3231 and 3232 according to control of the controller 3210.

The nonvolatile memory devices 3231 and 3232 may be used as storage media of the memory system 3200.

The PMIC 3240 may provide the power inputted through the connection terminal 3250 to the inside of the memory system 3200. The PMIC 3240 may manage the power of the memory system 3200 according to control of the controller 3210.

The connection terminal 3250 may be coupled to the connection terminal 3110 of the host device 3100. Through the connection terminal 3250, signals such as commands, addresses, data, and so forth, and power may be transferred between the host device 3100 and the memory system 3200. The connection terminal 3250 may be configured as one or more of various types depending on an interface scheme between the host device 3100 and the memory system 3200. The connection terminal 3250 may be disposed on a side of the memory system 3200, as shown.

Figure 9:
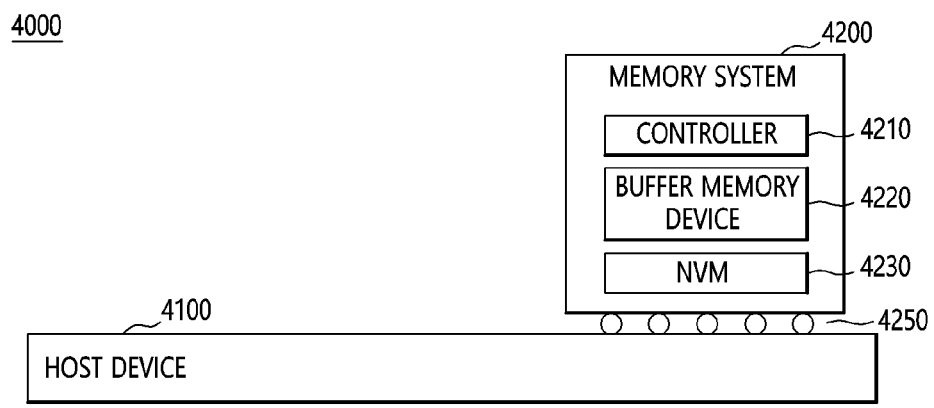
FIG. 9 illustrates an example of a data processing system based on some embodiments of the disclosed technology.

FIG. 9 is a diagram illustrating an example of a data processing system 4000 based on some embodiments of the disclosed technology. Referring to FIG. 9, the data processing system 4000 may include a host device 4100 and a memory system 4200.

The host device 4100 may be configured in the form of a board, such as a printed circuit board. Although not shown, the host device 4100 may include internal function blocks for performing the function of a host device.

The host device 4100 is configured to comprise external device 100 shown in FIGS. 1 to 3. The memory system 4200 is configured to comprise the storage device 200 shown in FIG. 1 or 4.

The memory system 4200 may be configured in the form of a surface-mounted type package. The memory system 4200 may be mounted to the host device 4100 through solder balls 4250. The memory system 4200 may include a controller 4210, a buffer memory device 4220, and a nonvolatile memory device 4230.

The controller 4210 may control general operations of the memory system 4200. The controller 4210 may be configured in the same manner as the controller 110 shown in FIGS. 1 and 2.

The buffer memory device 4220 may temporarily store data to be stored in the nonvolatile memory device 4230. Further, the buffer memory device 4220 may temporarily store data read from the nonvolatile memory device 4230. The data temporarily stored in the buffer memory device 4220 may be transmitted to the host device 4100 or the nonvolatile memory device 4230 according to control of the controller 4210.

The nonvolatile memory device 4230 may be used as the storage medium of the memory system 4200.

Figure 10:
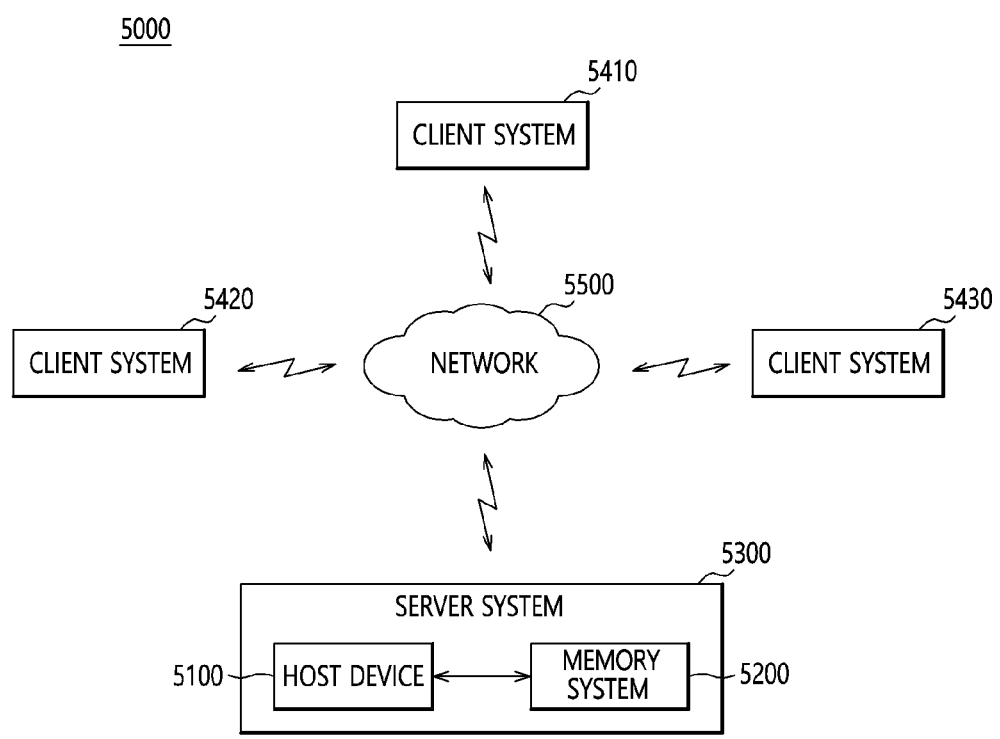
FIG. 10 illustrates an example of a network system including a data storage device based on some embodiments of the disclosed technology.

FIG. 10 is a diagram illustrating an example of a network system 5000 including a data storage device, based on some embodiments of the disclosed technology. Referring to FIG. 10, the network system 5000 may include a server system 5300 and a plurality of client systems 5410, 5420, and 5430, which are coupled through a network 5500.

The server system 5300 may service data in response to requests from the plurality of client systems 5410 to 5430. For example, the server system 5300 may store the data provided by the plurality of client systems 5410 to 5430. For another example, the server system 5300 may provide data to the plurality of client systems 5410 to 5430.

The server system 5300 may include a host device 5100 and a memory system 5200. The host device 5100 is configured to comprise external device 100 shown in FIGS. 1 to 3. The memory system 5200 is configured to comprise the storage device 200 shown in FIG. 1 or 4.

Figure 11:
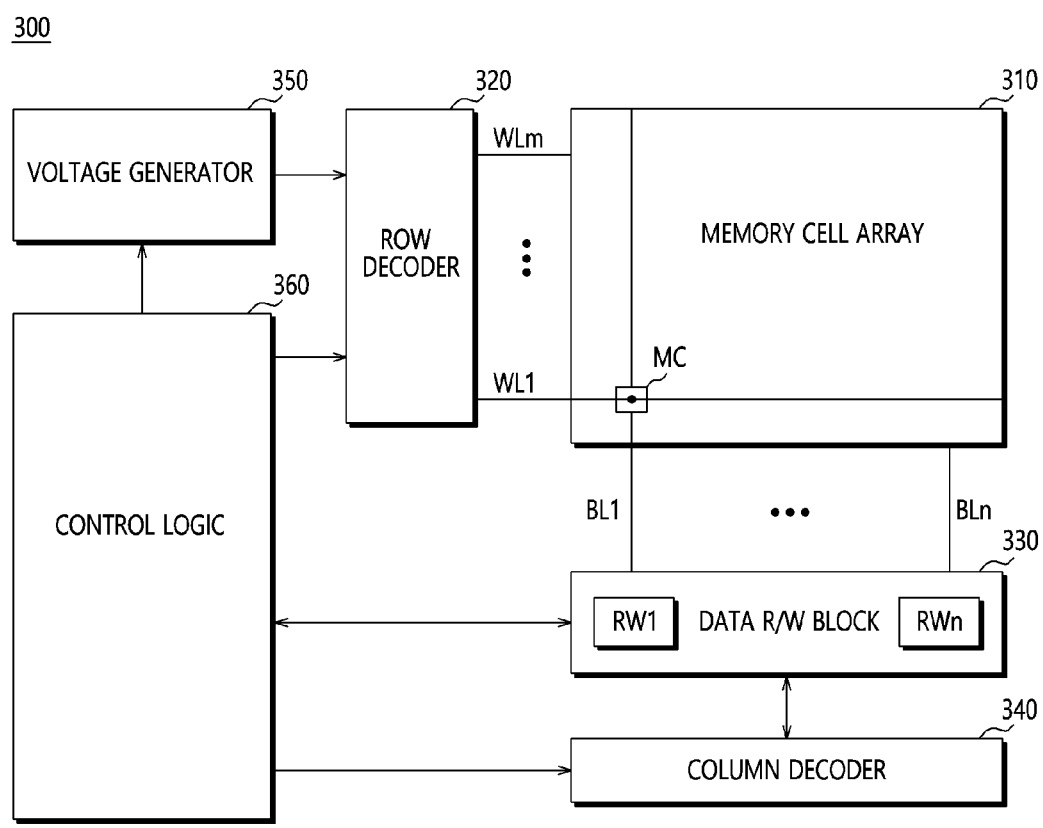
FIG. 11 illustrates an example of a nonvolatile memory device included in a data storage device based on some embodiments of the disclosed technology.

FIG. 11 is a block diagram illustrating an example of a nonvolatile memory device 300 included in a data storage device, such as the data storage device 10, based on some embodiments of the disclosed technology. Referring to FIG. 11, the nonvolatile memory device 300 may include a memory cell array 310, a row decoder 320, a data read/write block 330, a column decoder 340, a voltage generator 350, and a control logic 360.

The memory cell array 310 may include memory cells MC which are arranged at areas where word lines WL1 to WLm and bit lines BL1 to BLn intersect with each other.

The memory cell array 310 may comprise a three-dimensional memory array. The three-dimensional memory array, for example, has a stacked structure by perpendicular direction to the flat surface of a semiconductor substrate. Moreover, the three-dimensional memory array means a structure including NAND strings which memory cells comprised in NAND strings are stacked perpendicular to the flat surface of a semiconductor substrate.

The structure of the three-dimensional memory array is not limited to the embodiment indicated above. The memory array structure can be formed in a highly integrated manner with horizontal directionality as well as vertical directionality. In an embodiment, in the NAND strings of the three-dimensional memory array memory cells are arranged in the horizontal and vertical directions with respect to the surface of the semiconductor substrate. The memory cells may be variously spaced to provide different degrees of integration The row decoder 320 may be coupled with the memory cell array 310 through the word lines WL1 to WLm. The row decoder 320 may operate according to control of the control logic 360. The row decoder 320 may decode an address provided by an external device (not shown). The row decoder 320 may select and drive the word lines WL1 to WLm, based on a decoding result. For instance, the row decoder 320 may provide a word line voltage, provided by the voltage generator 350, to the word lines WL1 to WLm.

The data read/write block 330 may be coupled with the memory cell array 310 through the bit lines BL1 to BLn. The data read/write block 330 may include read/write circuits RW1 to RWn, respectively, corresponding to the bit lines BL1 to BLn. The data read/write block 330 may operate according to control of the control logic 360. The data read/write block 330 may operate as a write driver or a sense amplifier, according to an operation mode. For example, the data read/write block 330 may operate as a write driver, which stores data provided by the external device in the memory cell array 310 in a write operation. For another example, the data read/write block 330 may operate as a sense amplifier, which reads out data from the memory cell array 310 in a read operation.

The column decoder 340 may operate according to control of the control logic 360. The column decoder 340 may decode an address provided by the external device. The column decoder 340 may couple the read/write circuits RW1 to RWn of the data read/write block 330, respectively corresponding to the bit lines BL1 to BLn, with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided by the external device. For example, the control logic 360 may control operations of the nonvolatile memory device 300 such as read, write, and erase operations of the nonvolatile memory device 300.

While this patent document contains many specifics in the disclosed examples, these should not be construed as limitations on the scope of any subject matter or of what may be claimed, but rather as descriptions of features that may be specific to particular embodiments. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Only a few implementations and examples are described and other implementations, enhancements and variations can be made based on what is described and illustrated in this patent document.

What is claimed is:

1. A data processing system comprising:
    a storage device configured to: transmit, to an exterior, prediction information, for each power mode, that indicates a predicted time for performing a background operation for managing a memory device; and perform the background operation in an idle state of the storage device by switching to a corresponding power mode in response to a power mode control signal that is received in the idle state; and
    a control device configured to: determine a power mode of the storage device and an idle time for the idle state during which the background operation is performed based on the prediction information; transmit the power mode control signal to the storage device; and suspend, during the idle time, execution of a command processing request transmitted to the storage device.

2. The data processing system according to claim 1, wherein the control device includes a submission queue corresponding to a newly generated command,
    the storage device includes a submission queue register configured to store a tail pointer indicating a last command storage position of the submission queue, and
    the control device is configured to suspend an update of the tail pointer in order to suspend execution of the command processing request.

3. The data processing system according to claim 2, wherein the control device is configured to update the tail pointer when the submission queue becomes full during the idle time.

4. The data processing system according to claim 1, wherein the storage device is configured to further include a temperature sensor, and the prediction information is configured to further include temperature information.

5. The data processing system according to claim 4, wherein the control device is configured to determine the power mode of the storage device and the idle time by further referring to the temperature information.

6. The data processing system according to claim 1, wherein the storage device is configured to substantially maintain an idle state during the idle time.

7. The data processing system according to claim 1, wherein the prediction information and the power mode control signal are transmitted or received through one of interface devices based on system management bus (SMBus), inter-integrated circuit (I2C), and improved inter-integrated circuit (I3C) protocols.

8. The data processing system according to claim 1, wherein the background operation includes at least one of garbage collection, data migration, wear leveling, read refresh, and background trim.

9. An operation method of a data processing system, the operation method comprising:
    generating prediction information that indicates a prediction, for each power mode, of a time it takes to perform a background operation for managing a memory device;
    determining a power mode of the storage device and an idle time for performing the background operation based on the prediction information to transmit a power mode control signal corresponding to the power mode to the storage device;
    upon receiving the power mode control signal in an idle state, performing the background operation by switching to a power mode corresponding to the power mode control signal; and
    suspending, during the idle time, execution of a command processing request transmitted to the data processing system.

10. The operation method according to claim 9, wherein the data processing system includes an external device and a storage device, wherein the external device that includes a submission queue corresponding to a newly generated command,
    the storage device includes a submission queue register configured to store a tail pointer indicating a last command storage position of the submission queue, and
    wherein the suspending of the execution of the command processing request includes suspending of an update of the tail pointer.

11. The operation method according to claim 10, further comprising:
    updating the tail pointer when the submission queue becomes full during the idle time.

12. The operation method according to claim 9, wherein the data processing system further includes a temperature sensor, and the prediction information is generated to further include temperature information.

13. The operation method according to claim 12, further comprising referring to the temperature information when generating the power mode control signal.

14. The operation method according to claim 9, further comprising maintaining an idle state during the idle time.

15. The operation method according to claim 9, wherein the prediction information and the power mode control signal are transmitted or received through one of interface devices based on system management bus (SMBus), inter-integrated circuit (I2C), and improved inter-integrated circuit (I3C) protocols.

16. The operation method according to claim 9, wherein the background operation includes at least one of garbage collection, data migration, wear leveling, read refresh, and background trim.

17. A storage device comprising:
a memory device; and
a memory controller configured to: transmit, to an exterior, prediction information, for each power mode, that indicates a predicted time for performing a background operation for managing the memory device to be performed; and perform the background operation on the memory device in an idle state by switching to a corresponding power mode in response to receiving a power mode control signal from the exterior in the idle state.

18. The storage device according to claim 17, wherein the memory controller includes a submission queue register configured to store a tail pointer updated by the exterior, and is configured to perform the background operation before the tail pointer is updated.

19. The storage device according to claim 17, wherein the storage device is configured to further include a temperature sensor, and the prediction information is configured to further include temperature information.

* * * * *